United States Patent Office 2,889,259

Patented June 2, 1959

2,889,259

PROCESS FOR THE CHLORO-SULFONATION OF POLYETHYLENE

Heinz Noeske, Oberhausen-Sterkrade, and Otto Roelen, Oberhausen-Holten, Germany, assignors to Ruhrchemie Aktiengesellschaft, Oberhausen-Holten, Germany No Drawing. Application February 8, 1956 Serial No. 564,325

Claims priority, application Germany March 3, 1955

6 Claims. (Cl. 204—162)

It has already been suggested to produce polyethylene by polymerization of ethylene with polymerization stimulants containing preferably organometallic compounds. Examples of suitable polymerization stimulants are mixtures of titanium tetrachloride and aluminum alkyl compounds, such as diethyl-aluminum monochloride or aluminum triethyl or diisobutyl-aluminum monochloride. Instead of titanium tetrachloride other metal salts may be used such as zirconium acetyl acetonate or thorium acetyl acetonate. The molecular weight of the resulting polymer may be varied within relatively wide limits, viz. between about 25,000 and more than 1,000,000 depending upon what polymerization stimulants or combinations of the above-mentioned polymerization stimulants are used. The polymerization is effected at relatively low pressures generally not exceeding 100 atmospheres and at temperatures of 20 to about 100° C. When suitably selecting the reaction conditions, there are obtained fine-grained white polymers the particle sizes of which range practically below 0.25 mm. and predominantly below 0.08 mm.

It has also been suggested to chloro-sulfonate polyethylenes as they may be obtained, for example, by thermal polymerization of ethylene. These polyethylenes have generally molecular weights of about 20,000. They are relatively well soluble in organic solvents such as carbon tetrachloride and decaline. The chloro-sulfonation of polyethylene is effected in solutions as, for example, in a solution of polyethylene in carbon tetrachloride.

The polyethylenes as obtained by the working method mentioned above with the use of polymerization stimulants preferably containing organometallic compounds are nearly insoluble in organic solvents in contrast to the polyethylenes on the market up to the present. Therefore, the chloro-sulfonation of polyethylenes of this type is not possible by the conventional processes.

It has been found that polyethylenes of this kind can also be chloro-sulfonated in a very simple manner by allowing a mixture of gaseous sulfur dioxide and gaseous chlorine to act upon the solid polyethylene which is in as fine a distribution as possible. It was surprising that the chloro-sulfonation in the solid phase can be effected at a sufficiently high reaction rate and with favorable results in the absence of a solvent or of another auxiliary liquid. In this reaction, the polyethylene does not undergo a change of its structure and continues to be a white pulverulent material after the chloro-sulfonation.

The temperature in the chloro-sulfonation should not be substantially in excess of about 100° C. The most favorable range of temperature is between 40° and 80° C. It may be of advantage to effect an irradiation with, for example, ultraviolet light during the treatment. The ratio of $SO_2$:$Cl_2$ may be varied. In general, a ratio of 1:1 to 2:1 will be used. In this manner, there are obtained reaction products the sulfur content of which is as high as about 10% by weight and the chlorine content of which is as high as about 20% by weight.

It may be of advantage in some cases to effect a treatment with gaseous chlorine before and/or after the chloro-sulfonation. It is possible in this manner to produce reaction products having chlorine contents of as high as about 50%.

In practice, the chloro-sulfonation may be effected in various manners. It is possible, for example, to agitate the fine-grained polyethylene in shelved furnaces by means of stirring devices and expose it to the action of a gas mixture of $SO_2$ and $Cl_2$ which has preferably been preheated. Other apparatus in which the chloro-sulfonation may be effected are rotary drums, kneading machines, screw conveyors arranged in horizontal or vertical vessels. It is also possible to use similar devices as are conventionally used in performing catalytic cracking processes with moving-bed catalysts.

A particularly advantageous process for carrying out the sulfo-chlorination is the fluidized process. Due to the very fine-grained structure of polyethylene there are no difficulties encountered in carrying out this process. The removal of the heat of reaction may be effected in various manners as, for example, by means of cooled wall surfaces or by circulating $SO_2$ or $Cl_2$ which may, if necessary or desired, be diluted with inert gases. Control of the removal of the reaction heat is also possible by recycling a part of the solid reaction products.

The invention will now be more fully described in a number of examples, but it should be understood that these are given by way of illustration and not of limitation and that many changes in the details can be made without departing from the spirit of the invention.

*Example 1*

Pulverulent polyethylene in an amount of 48 grams was filled into a glass tube of 45 mm. in diameter and 500 mm. in length, closed at the bottom by a glass frit and provided with a jacket through which water of 50° C. was passed. The polyethylene had been prepared by polymerization of ethylene at atmospheric pressure and a temperature of 60–80° C. with the use of a catalyst consisting of titanium tetrachloride and aluminum diethyl monochloride and in the presence of a saturated hydrocarbon of the chain length $C_7$–$C_{10}$ freed from oxygen-containing compounds. After the termination of the polymerization and subsequent treatment with steam, the polyethylene was separated from the hydrocarbon. The polyethylene thus obtained was a white powder, 75% of which had a particle size of below 0.08 mm. The molecular weight of the product was 80,000. A gas mixture including 50 liters of chlorine and 50 liters of sulfur dioxide which had previously been heated to 50° C. was hourly passed through the glass frit. The apparatus was irradiated by a 200 watt bulb. Under these conditions, a fluidized bed developed. After a reaction time of 6 hours, the experiment was discontinued. The reaction product was freed from adsorbed gases by evacuation at 80° C. There resulted a white pulverulent product having a chlorine content of 18% by weight and a sulfur content of 3.2% by weight.

*Example 2*

48 grams of a polyethylene having a molecular weight of 900,000 were filled into the apparatus described in Example 1. A mixture of 60 liters/hr. of sulfur dioxide and 30 liters/hr. of chlorine was passed through the glass frit. The temperature of the circulating water was 60° C. The irradiation was effected in the manner described in Example 1. Under these conditions, a fluidized bed developed. After a reaction time of 6 hours, the experiment was discontinued and the product was purified by evacuation. A finished product containing 12.5% of chlorine and 5.8% of sulfur was formed.

*Example 3*

In the apparatus described in Example 1, 48 grams of polyethylene having a molecular weight of 900,000 was treated for four hours at a temperature of 80° C. with chlorine while being in the fluidized state. Following this, the temperature was decreased to 50° C. and a gas stream comprising 55 liters/hr. of chlorine and 55 liters/hr. of sulfur dioxide was passed through the fluidized substance. After 2 hours reaction and purification by evacuation a product resulted containing 38.7% of chlorine and 0.8% of sulfur.

*Example 4*

48 grams of a polyethylene having a molecular weight of 1,400,000, were chloro-sulfonated for 5 hours at 65° C. under the conditions set forth in Example 1 using a mixture of 80 liters/hr. of sulfur dioxide and 40 liters/hr. of chlorine. Thereafter, the product was treated for 3 hours at 65° C. with 100 liters/hr. of chlorine in a fluidized bed. The resulting product, after purification, contained 30.8% of chlorine and 3.1% of sulfur dioxide.

What we claim is:

1. A process for the chloro-sulfonation of polyethylene having a molecular weight of 80,000 to 1,400,000, as obtained by the polymerization of ethylene at pressures up to 100 atmospheres and at temperatures below 100° C. and in the presence of catalysts consisting of mixtures of aluminum alkyl compounds with titanium tetrachloride, which consists of treating finely powdered polyethylene with a mixture of gaseous chlorine and gaseous sulfur dioxide at temperatures not substantially in excess of 100° C., in the absence of solvents and while maintaining said polyethylene as a fluidized bed.

2. The process according to claim 1, in which the chlorosulfonation is effected at temperatures of between 40 and 80° C.

3. The process according to claim 1, in which an irradiation is effected during the treatment.

4. The process according to claim 3, in which the irradiation is carried out with ultraviolet light.

5. The process according to claim 1, in which a treatment with gaseous chlorine is effected before the chlorosulfonation.

6. The process according to claim 1, in which a treatment with gaseous chlorine is effected after the chlorosulfonation.

References Cited in the file of this patent

UNITED STATES PATENTS

| | | |
|---|---|---|
| 2,212,786 | McQueen | Aug. 27, 1940 |
| 2,799,640 | Pevere et al. | July 16, 1957 |